United States Patent
Wang et al.

(10) Patent No.: US 12,252,601 B1
(45) Date of Patent: Mar. 18, 2025

(54) PREPARATION METHOD FOR BIO-BASED NUCLEATING AGENT FOR POLY(ETHYLENE FURANDICARBOXYLATE) AND APPLICATION THEREOF

(71) Applicant: Taiyuan University of Science and Technology, Shanxi (CN)

(72) Inventors: Bo Wang, Shanxi (CN); Tianjiao Zhao, Shanxi (CN); Yubing Hou, Shanxi (CN); Fengqiao Ju, Shanxi (CN); Yanli Zhang, Shanxi (CN); Yuying Zhao, Shanxi (CN); Dan Zhou, Shanxi (CN); Yapeng Dong, Shanxi (CN); Meizhen Wang, Shanxi (CN); Wenju Cui, Shanxi (CN)

(73) Assignee: Taiyuan University of Science and Technoloy, Shanxi (CN)

( * ) Notice: Subject to any disclaimer, the term of this patent is extended or adjusted under 35 U.S.C. 154(b) by 0 days.

(21) Appl. No.: 18/778,882

(22) Filed: Jul. 19, 2024

(30) Foreign Application Priority Data

Dec. 15, 2023 (CN) .......................... 202311728392.9

(51) Int. Cl.
C08K 5/20 (2006.01)

(52) U.S. Cl.
CPC ...................................... *C08K 5/20* (2013.01)

(58) Field of Classification Search
CPC ....................................................... C08K 5/20
See application file for complete search history.

(56) References Cited

FOREIGN PATENT DOCUMENTS

CN 111848599 A 10/2020

OTHER PUBLICATIONS

4-Sulfamoylphenylalkylamides as Inhibitors of Carbonic Anhydrases Expressed in Vibrio cholerae, Francesca Mancuso etc., ChemMedChem, 16, 3787-3794; (Oct. 18, 2021).

*Primary Examiner* — Angela C Scott

(57) ABSTRACT

Aiming at the problem of slow crystallization rate of poly (ethylene furandicarboxylate) (PEF), a preparation method for a bio-based nucleating agent for PEF and an application thereof are disclosed. In a technical solution, glycine having a bio-based source is subjected to an amidation reaction with furoic acid under the catalysis of p-toluenesulfonic acid, followed by an acid-base neutralization reaction with sodium hydroxide to obtain a bio-based nucleating agent for PEF. The bio-based nucleating agent prepared by the present disclosure can significantly accelerate a crystallization rate of PEF. Most importantly, the bio-based nucleating agent has no effect on the bio-based properties of PEF.

3 Claims, No Drawings

PREPARATION METHOD FOR BIO-BASED NUCLEATING AGENT FOR POLY(ETHYLENE FURANDICARBOXYLATE) AND APPLICATION THEREOF

CROSS-REFERENCE TO RELATED APPLICATIONS

This application claims priority of Chinese Patent Application No. 202311728392.9, filed on Dec. 15, 2023, the entire contents of which are incorporated herein by reference.

TECHNICAL FIELD

The present disclosure relates to a preparation method for a bio-based nucleating agent for poly(ethylene furandicarboxylate) (PEF) and an application thereof, falling within the technical field of polymer materials.

BACKGROUND

At present, most of polymer materials such as polyethylene (PE) and polyethylene terephthalate (PET) are non-renewable petroleum-based, which have a serious impact on sustainable development. The monomer of PEF is bio-based, and has the advantages of renewability and biodegradability, so it has attracted wide attention from various industries. However, the low molecular symmetry and large intermolecular dipolar interaction of PEF hinder the molecular chain movement in a crystallization process and slow a crystallization rate, thus hindering the industrial application process.

In Chinese invention patents with publication numbers CN 107118521A and CN 107141745A, the crystallization rate of PEF is increased by adding nucleating agents, such as talcum powder, sodium carbonate, silicon dioxide, isosorbide, sodium benzoate, N,N'-(ethane-1,2-diyl)didodecanamide and ionic polymers of ethylene-methacrylic acid. However, the above nucleating agents have limited contribution to the crystallization rate of PEF and the mechanism is unclear. Most importantly, the above nucleating agents have a relatively small bio-based content, and may have a disadvantage of affecting bio-based property after blending with PEF.

Therefore, there is a need to develop a bio-based nucleating agent that is stable in molecular structure and can act together through a variety of nucleation mechanisms without affecting the bio-based properties of PEF, thus accelerating the crystallization rate and promoting the market application.

SUMMARY

To solve the problems existing in the prior art, the present disclosure provides a preparation method for a bio-based nucleating agent for PEF and an application thereof. The bio-based nucleating agent has a stable molecular structure and can chemically nucleate with PEF to induce the epitaxial crystallization of PEF, thus greatly increasing the crystallization rate of PEF. Most importantly, the bio-based nucleating agent has a bio-based source, which is of great significance for the industrial application of PEF under the background of "dual carbon".

A bio-based nucleating agent for PEF provided by the present disclosure includes the following molecular structure:

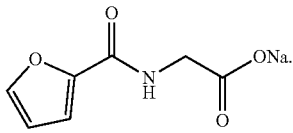

A preparation method for a bio-based nucleating agent for PEF includes the steps of: placing 4 g of glycine into 200 mL of acetone, ultrasonically dispersing a mixture for 30 min at a frequency of 20 kHz at 40° C., subsequently adding 12 g of furoic acid and 0.2 g of p-toluenesulfonic acid, followed by stirring and reacting at 40° C. for 12 h using an electric stirrer at a rotation speed of 1200 rpm, removing acetone by distillation under reduced pressure after completion of the reaction, washing the obtained solid with 500 mL of acetone and 800 mL of distilled water, and drying the washed solid to a constant weight at 80° C. to obtain an intermediate; and weighing and placing 6.4 g of the intermediate and 3.2 g of sodium hydroxide into 200 mL of distilled water, followed by stirring and reacting at 25° C. for 8 h using the electric stirrer at a rotation speed of 800 rpm, washing the obtained solid with distilled water until neutral after completion of the reaction, and drying the washed solid to a constant weight at 80° C. to obtain a bio-based nucleating agent for PEF.

Preferably, in an improvement, a mass ratio of raw materials glycine and furoic acid is 1:3 in the synthesis steps of the bio-based nucleating agent for PEF. A mass ratio of the intermediate to the sodium hydroxide is 2:1.

In the present disclosure, by optimizing mass ratios of reactants in reactions, on the basis of energy saving and production cost, the synthesized bio-based nucleating agent for PEF can play its due role stably.

Preferably, in an improvement, a reaction temperature is 40° C. and a reaction time is 12 h in the first synthesis step of the bio-based nucleating agent for PEF. A reaction temperature is 25° C. and a reaction time is 8 h in the second step.

In the present disclosure, the reaction temperature and time are determined based on a boiling point, reactivity and production cost of a solvent, and the above reaction conditions are better conditions verified by experiments.

The present disclosure further provides an application of a bio-based nucleating agent for PEF. A usage amount of the above bio-based nucleating agent is 1%-2% of a mass of PEF.

Preferably, a usage amount of the bio-based nucleating agent is 1.5%.

An addition amount of the bio-based nucleating agent synthesized by the present disclosure must be appropriate, too little addition amount cannot achieve the expected effect, and too much addition amount will lead to the agglomeration of the bio-based nucleating agent and affect the action effect. The above addition amounts are better conditions verified by experiments.

Compared with the prior art, the present disclosure has the following advantageous effects.

1. Glycine reacts with furoic acid to obtain a chain segment containing furan amide bonds, which can be used as a substrate to induce the epitaxial crystallization of PEF. By stacking a molecular chain of PEF on a side of the substrate to achieve the best epitaxy, the free energy required for crystal growth is reduced, thus accelerating the growth rate of crystal.

2. Sodium hydroxide reacts with glycine to obtain a chain segment containing metal carboxylate, which reacts with ester bonds of PEF during processing to form a sodium-terminated ionic polymer. The combination of sodium ion terminal groups into clusters can directly induce the close packing of surrounding molecular chains, thus accelerating the crystallization rate.

3. Various components of the bio-based nucleating agent are combined through chemical reaction, and in the molecular structure of the bio-based nucleating agent, various molecular chain segments are tightly connected through chemical bonds, so that the overall molecular structure remains stable and is not easy to be decomposed during processing, ensuring that the performance can be normally exerted.

4. The raw materials glycine and furoic acid are derived from bio-base, so the synthesized bio-based nucleating agent does not affect the bio-based properties of PEF, which is of great significance to the market application of PEF.

DETAILED DESCRIPTION

In order that the technical problems to be solved by the present disclosure, technical solutions and advantages of the present disclosure may be more clearly understood, the present disclosure is described in further detail with reference to the following examples. It is to be understood that the specific examples described herein are merely illustrative of the present disclosure and are not intended to limit the present disclosure. Unless otherwise indicated, the raw materials, reagents and equipment used in the present disclosure are those conventionally available in the art. PEF is purchased from Zhongke Guosheng (Hangzhou) Technology Co., Ltd, and has an intrinsic viscosity of 0.57 dL/g.

Example 1

4 g of glycine (CAS: 200-272-2) was placed into 200 mL of acetone, a mixture was ultrasonically dispersed for 30 min at a frequency of 20 kHz at 40° C., and 12 g of furoic acid (CAS: 88-14-2) and 0.2 g of p-toluenesulfonic acid (CAS: 104-15-4) were subsequently added, followed by stirring and reacting at 40° C. for 12 h using an electric stirrer at a rotation speed of 1200 rpm; and acetone was removed by distillation under reduced pressure after completion of the reaction, the obtained solid was washed with 500 mL of acetone and 800 mL of distilled water, and the washed solid was dried to a constant weight at 80° C. to obtain an intermediate. 6.4 g of the intermediate and 3.2 g of sodium hydroxide (CAS: 1310-73-2) were weighed and placed into 200 mL of distilled water, followed by stirring and reacting at 25° C. for 8 h using the electric stirrer at a rotation speed of 800 rpm; and the obtained solid was washed with distilled water until neutral after completion of the reaction, and the washed solid was dried to a constant weight at 80° C. to obtain a bio-based nucleating agent for PEF.

After PEF and the bio-based nucleating agent were conventionally mixed in a mass ratio of 100:1.5 in a high-speed mixer (at a mixing rotation speed of 3000 rpm for a mixing time of 5 min), a mixture was extruded and granulated in a conventional twin-screw extruder to obtain test samples. 6 mg of the above sample was taken in an aluminum crucible and placed in a differential scanning calorimeter (DSC). A half-crystallization time ($t_{1/2}$) of the mixture obtained above was measured by DSC.

The specific process is as follows. The mixture was heated to 250° C. at a rate of 10° C./min and the temperature was kept for 3 min; the temperature was reduced to 180° C. at a rate of 40° C./min and kept for 60 min; and finally, the temperature was reduced to 40° C. at a rate of 10° C./min. A relative crystallinity X(t) was calculated according to an isothermal curve by the following formula; and a half-crystallization time ($t_{1/2}$) was obtained according to a relative crystallinity X(t)=0.5. The specific data are shown in Table 1.

$$X(t) = \int_{t0}^{t}\left(\frac{dH}{dt}\right)dt \Big/ \int_{t0}^{\infty}\left(\frac{dH}{dt}\right)dt$$

Example 2

This example was substantially identical to Example 1, except that a sample was prepared using the bio-based nucleating agent synthesized in Example 1 and PEF in a mass ratio of 100:1. The test data are shown in Table 1.

Example 3

This example was substantially identical to Example 1, except that a sample was prepared using the bio-based nucleating agent synthesized in Example 1 and PEF in a mass ratio of 100:2. The test data are shown in Table 1.

Comparative Example 1

Pure PEF was extruded and granulated in a conventional twin-screw extruder to obtain test samples. A half-crystallization time ($t_{1/2}$) was obtained according to the method of Example 1. The specific data are shown in Table 1.

Comparative Example 2

After PEF and glycine were conventionally mixed in a mass ratio of 100:1.5 in a high-speed mixer (at a mixing rotation speed of 3000 rpm for a mixing time of 5 min), a mixture was extruded and granulated in a conventional twin-screw extruder to obtain test samples. A half-crystallization time ($t_{1/2}$) was obtained according to the method of Example 1. The specific data are shown in Table 1.

Comparative Example 3

After PEF and furoic acid were conventionally mixed in a mass ratio of 100:1.5 in a high-speed mixer (at a mixing rotation speed of 3000 rpm for a mixing time of 5 min), a mixture was extruded and granulated in a conventional twin-screw extruder to obtain test samples. A half-crystallization time ($t_{1/2}$) was obtained according to the method of Example 1. The specific data are shown in Table 1.

Comparative Example 4

After PEF and sodium hydroxide were conventionally mixed in a mass ratio of 100:1.5 in a high-speed mixer (at a mixing rotation speed of 3000 rpm for a mixing time of 5 min), a mixture was extruded and granulated in a conventional twin-screw extruder to obtain test samples. A half-crystallization time ($t_{1/2}$) was obtained according to the method of Example 1. The specific data are shown in Table 1.

Comparative Example 5

After PEF and an intermediate were conventionally mixed in a mass ratio of 100:1.5 in a high-speed mixer (at a mixing rotation speed of 3000 rpm for a mixing time of 5 min), a mixture was extruded and granulated in a conventional twin-screw extruder to obtain test samples. A half-crystallization time ($t_{1/2}$) was obtained according to the method of Example 1. The specific data are shown in Table 1.

Comparative Example 6

After 6.4 g of intermediate and 3.2 g of sodium hydroxide were simply mixed in a high-speed mixer (at a mixing rotation speed of 3000 rpm for a mixing time of 5 min), and a mixture and PEF were conventionally mixed in a mass ratio of 1.5:100 in the high-speed mixer (at a mixing rotation speed of 3000 rpm for a mixing time of 5 min), a final mixture was extruded and granulated in a conventional twin-screw extruder to obtain test samples. A half-crystallization time ($t_{1/2}$) was obtained according to the method of Example 1. The specific data are shown in Table 1.

Comparative Example 7

After 4 g of glycine, 12 g of furoic acid and 3.2 g of sodium hydroxide were simply mixed (at a mixing rotation speed of 3000 rpm for a mixing time of 5 min), and a mixture and PEF were conventionally mixed in a mass ratio of 1.5:100 in a high-speed mixer (at a mixing rotation speed of 3000 rpm for a mixing time of 5 min), a final mixture was extruded and granulated in a conventional twin-screw extruder to obtain test samples. A half-crystallization time ($t_{1/2}$) was obtained according to the method of Example 1. The specific data are shown in Table 1.

TABLE 1

Test results of Examples and Comparative Examples

|  | $t_{1/2}$ (min) |
|---|---|
| Example 1 | 5.76 |
| Example 2 | 7.47 |
| Example 3 | 8.34 |
| Comparative Example 1 | 20.72 |
| Comparative Example 2 | 17.17 |
| Comparative Example 3 | 16.46 |
| Comparative Example 4 | 19.83 |
| Comparative Example 5 | 12.99 |
| Comparative Example 6 | 12.01 |
| Comparative Example 7 | 15.21 |

It can be seen from the experimental results in Table 1 that in Examples 1-3, crystallization rates are relatively fast with the addition of the bio-based nucleating agent for PEF prepared by the present disclosure. An addition amount of 1.5% in Example 1 is the best. Compared with the pure PEF of Comparative Example 1, it is indicated that the bio-based nucleating agent synthesized in the present disclosure has the effect of significantly accelerating the crystallization rate of PEF. In addition, adding too much or too little nucleating agent has an effect on increasing the crystallization rate.

The bio-based nucleating agent prepared by the present disclosure is synthesized by chemical reactions such that various chain segments act simultaneously to accelerate the crystallization rate of PEF to the maximum extent. However, in Comparative Examples 2-7, single raw materials, intermediates or raw materials are only simply mixed without sufficient chemical reaction, and the above functions cannot be fully exerted. Glycine added in Comparative Example 2 and furoic acid added in Comparative Example 3 can accelerate the crystallization rate of PEF as heterogeneous nucleating agents, but have a limited effect. In comparison, the intermediate added in Comparative Example 5 has a furanamide chain segment obtained by the reaction of glycine and furoic acid in the molecular structure, and the furanamide chain segment can provide a substrate for the epitaxial crystallization of PEF, greatly increasing the crystallization rate, but still has a certain gap compared with that in Example 1.

Sodium hydroxide added in Comparative Example 4 has strong basicity and only slightly accelerates the crystallization rate of PEF, the simple mixing cannot generate the required sodium carboxylate chain segment through chemical reactions, and no chemical reaction occurs with PEF during processing. Therefore, the enhancing effect of Comparative Example 6 with the intermediate and the sodium hydroxide is only slightly better than that of Comparative Example 5 with the intermediate only.

In Comparative Example 7, glycine, furoic acid and sodium hydroxide are added simultaneously, which do not undergo a chemical reaction to generate the required functional groups, and only play a heterogeneous nucleation role, so the enhancing effect is only better than that of Comparative Example 2, Comparative Example 3 and Comparative Example 4 with single component.

The above is only the preferred example of the present disclosure, which is not used to limit the present disclosure. Any modifications, equivalent substitutions and improvements made within the spirit and principle of the present disclosure are to be included in the scope of the present disclosure.

The invention claimed is:

1. A method of using a compound as a bio-based nucleating agent in poly(ethylene furandicarboxylate) (PEF), comprising:
   adding the compound to PEF;
   and mixing the compound and PEF to form a mixture, wherein
   the compound has a following molecular structure:

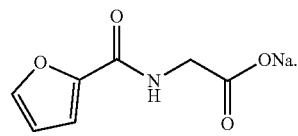

2. The method of using the compound as the bio-based nucleating agent in PEF according to claim 1, wherein a dosage of the compound as the bio-based nucleating agent in PEF is 1% to 2% of a mass of PEF.

3. The method of using the compound as the bio-based nucleating agent in PEF according to claim 2, wherein the dosage of the compound as the bio-based nucleating agent in PEF is 1.5% of the mass of PEF.

* * * * *